(12) United States Patent
Minty

(10) Patent No.: US 8,840,069 B2
(45) Date of Patent: Sep. 23, 2014

(54) WATER SCAVENGING SYSTEM

(75) Inventor: Andrew Minty, Bristol (GB)

(73) Assignee: Airbus Operations Limited, Bristol (GB)

(*) Notice: Subject to any disclaimer, the term of this patent is extended or adjusted under 35 U.S.C. 154(b) by 706 days.

(21) Appl. No.: 12/513,044

(22) PCT Filed: Nov. 12, 2007

(86) PCT No.: PCT/GB2007/050686
§ 371 (c)(1),
(2), (4) Date: Apr. 30, 2009

(87) PCT Pub. No.: WO2008/059288
PCT Pub. Date: May 22, 2008

(65) Prior Publication Data
US 2010/0071774 A1    Mar. 25, 2010

(30) Foreign Application Priority Data

Nov. 12, 2007  (GB) .................................. 0622564.3

(51) Int. Cl.
*B64D 37/02* (2006.01)
*B64D 37/34* (2006.01)

(52) U.S. Cl.
CPC ...................................... *B64D 37/34* (2013.01)
USPC ..................................... 244/135 R; 123/25 R

(58) Field of Classification Search
CPC ...... F02M 25/025; F02M 25/00; F02B 47/00; F02B 47/02
USPC .... 244/172.2, 135 R, 135 C; 123/25 R, 25 A, 123/25 C, 25 E, 25 L, 25 M, 497, 509
IPC ............................................ B64D 37/34, 37/00
See application file for complete search history.

(56) References Cited

U.S. PATENT DOCUMENTS 4,809,934 A * 3/1989 Rix ........................... 244/135 R
5,053,120 A   10/1991 Moellmann
(Continued)

FOREIGN PATENT DOCUMENTS

EP  0278755 A2  8/1988
GB  2241443 A   9/1991
(Continued)

OTHER PUBLICATIONS

ISR for PCT/GB2007/050686 dated Mar. 12, 2008.
(Continued)

*Primary Examiner* — Timothy D Collins
*Assistant Examiner* — Joshua Huson
(74) *Attorney, Agent, or Firm* — Lowe Hauptman & Ham, LLP

(57) ABSTRACT

A fuel pumping and water scavenging system for pumping fuel from a fuel tank towards an engine, the system comprising: first and second fuel pumps each having a pump inlet for collecting fuel from the fuel tank; and a water scavenging line coupling a water inlet to the pump inlet of the first pump. The first pump is configured to pump fuel towards the engine at a higher rate than the second pump, unless the first pump fails. A method of removing water from an aircraft fuel tank, the method comprising collecting water from a pool at the bottom of the fuel tank during take off or climb and feeding the water to an engine of the aircraft.

12 Claims, 6 Drawing Sheets

(56) References Cited

U.S. PATENT DOCUMENTS

| | | | |
|---|---|---|---|
| 6,095,118 A * | 8/2000 | Klinger et al. | 123/446 |
| 6,170,470 B1 | 1/2001 | Clarkson et al. | |
| 7,114,490 B2 * | 10/2006 | Zdroik | 123/497 |
| 2005/0217732 A1 * | 10/2005 | Tollner | 137/565.3 |
| 2007/0023014 A1 * | 2/2007 | Betz et al. | 123/509 |

FOREIGN PATENT DOCUMENTS

| | | |
|---|---|---|
| JP | 5700657 A | 6/1981 |
| WO | 2006036854 A2 | 4/2006 |

OTHER PUBLICATIONS

GB Search Report for GB0622564.3 dated Mar. 12, 2007.

\* cited by examiner

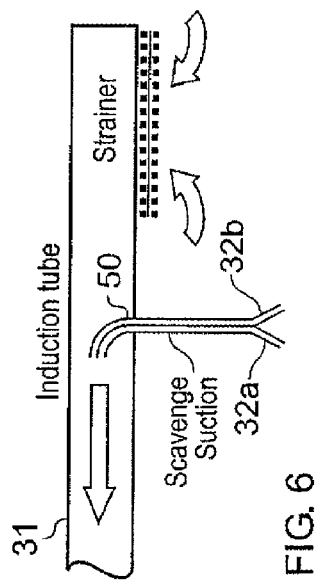
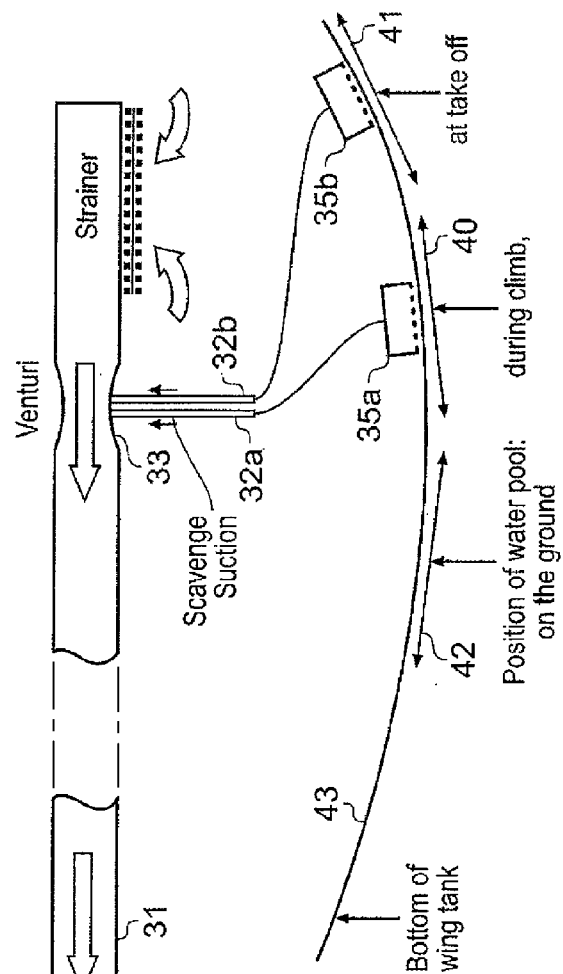
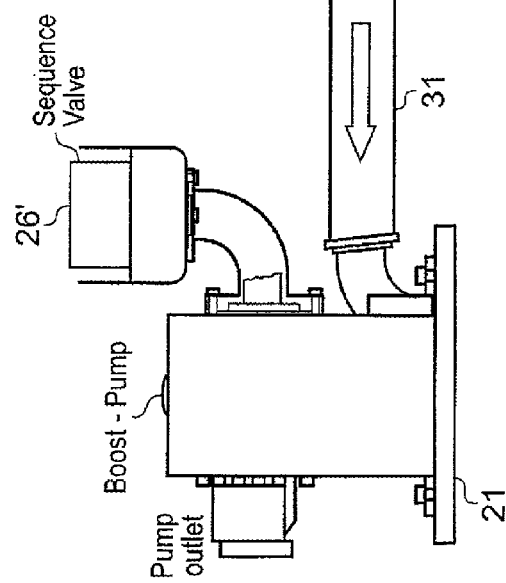

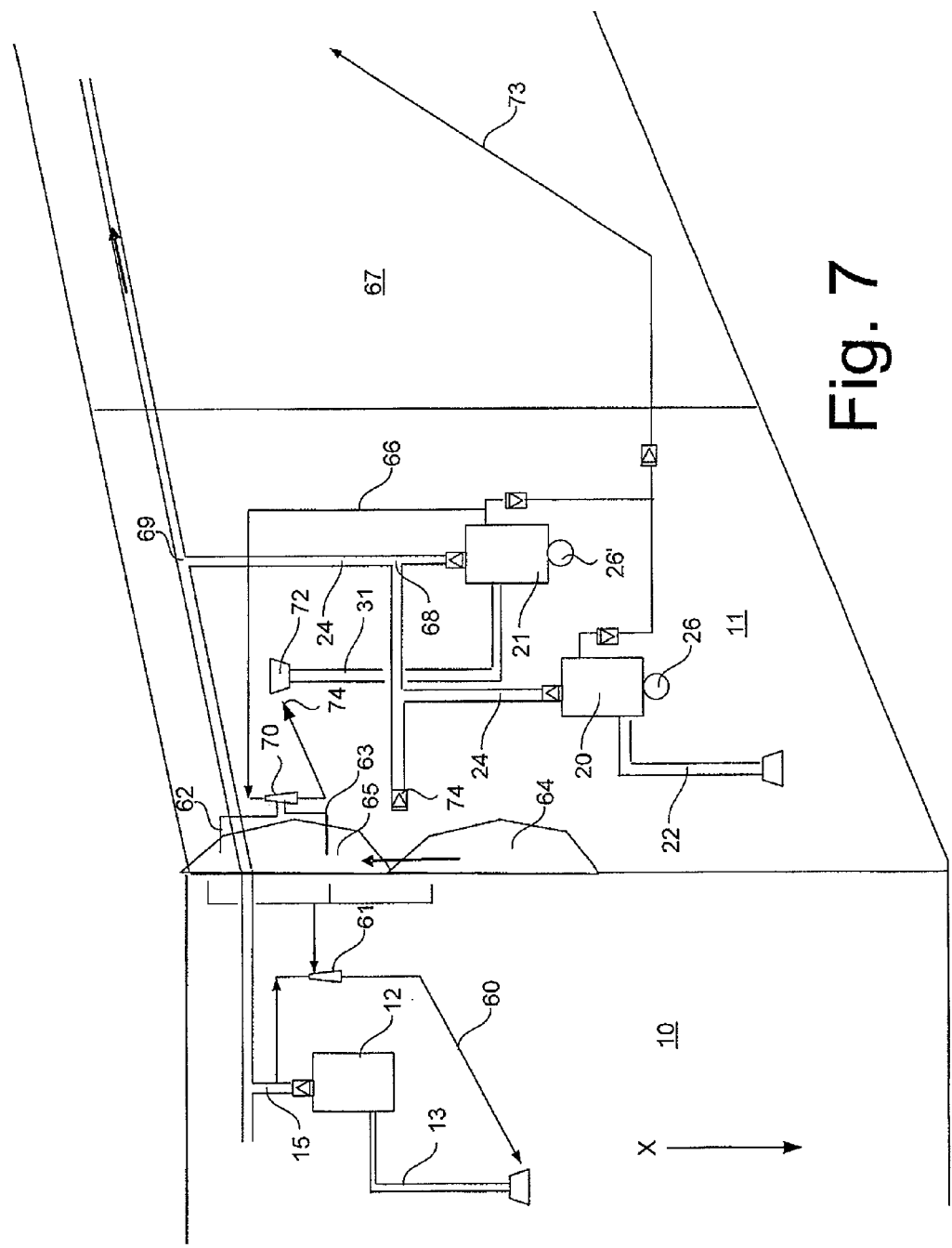

WATER SCAVENGING SYSTEM

RELATED APPLICATIONS

The present application is based on International Application Number PCT/GB2007/050686 filed Nov. 12, 2007, and claims priority from British Application Number 0622564.3 filed Nov. 13, 2006, the disclosures of which are hereby incorporated by reference herein in their entirety.

FIELD OF THE INVENTION

The present invention relates to a method and apparatus for removing water from a fuel tank.

BACKGROUND OF THE INVENTION

U.S. Pat. No. 4,809,934 describes a system for on-board disposal of water in aircraft fuel tanks. Water is drawn into a jet pump and dispersed into a fuel tank for consumption by the aircraft engines. A problem with the arrangement of U.S. Pat. No. 4,809,934 is that the water will only be fully removed when the fuel tank is empty. Also, the water dispersed in the fuel tank may create "snow" or cause icing in the tank at lower temperatures. Also, only a single fuel pump is provided, so there is no redundancy in the event of failure of the pump.

SUMMARY OF THE INVENTION

A first aspect of the invention provides a fuel pumping and water scavenging system comprising: first and second fuel pumps each arranged to collect fuel from the same fuel tank and pump it towards an engine; and a water scavenging line coupling a water inlet in the fuel tank to the first pump, wherein the first pump is arranged to pump fuel towards the engine at a higher rate than the second pump, unless the first pump fails.

A second aspect of the invention provides a method of removing water from a fuel tank using the system of the first aspect, the method comprising feeding water into the first pump with the water scavenging line; pumping fuel towards the engine with the first pump at a higher rate than the second pump; and pumping fuel towards the engine with the second pump at a higher rate than the first pump on failure of the first pump.

The second pump provides an element of redundancy in the event of failure of the first pump. Arranging the first pump to pump fuel towards the engine at a higher rate than the second pump ensures that the second pump does not interfere with the water scavenging function of the first pump.

Various techniques may be employed to ensure that the first pump pumps fuel towards the engine at a higher rate than the second pump. In one embodiment the first fuel pump further comprises a re-circulating outlet with a valve which closes at a first pressure; and the second fuel pump further comprises a re-circulating outlet with a valve which closes at a second pressure which is lower than the first pressure. In another embodiment the pumps have respective output lines which are coupled in parallel with each other, and the first fuel pump has a higher outlet pressure than the second fuel pump. Other techniques for achieving a similar result may be envisaged.

The water may be injected into the first pump by an electrically powered pump. However this introduces the problem of routing electrical power cables into the fuel tank. Therefore preferably the water is injected into the first pump by means of a jet pump. The use of a jet pump (instead of an electrically powered pump) means that no additional electrical power is required, with attendant cables, control and safety aspects.

The jet pump may be provided in a pump input line which couples a fuel inlet to the first pump, or in a re-circulating line which re-circulates fuel from an outlet of the first pump to an inlet of the first pump. In the former case the rate of flow of water is proportional to the rate of flow of fuel in the pump input line, and as a result the concentration of water in the pump input line remains relatively constant regardless of the fuel flow rate. The latter case may be preferred in some cases since no constriction is required in the pump input line, and no additional construction is required in the pump input line.

The jet pump may comprise a venturi constriction with the outlet of the water scavenging line positioned adjacent to the venturi constriction. Alternatively the jet pump may comprise an induction tube.

The first fuel pump may comprise a re-circulating output, and a re-circulating line coupling the re-circulating outlet to an inlet of the first pump. The re-circulating output can be used to "de-rate" the pump, and instead of opening into the fuel tank, the re-circulating output uses a re-circulating line to couple the flow back into the pump inlet. This ensures that water injected into the pump is not re-distributed into the fuel tank. The re-circulating output may also be used to provide the motive force for a jet pump, as described above.

The method and system of the first and second aspect of the invention may be useful in an aircraft fuel tank, or any other kind of fuel tank in which water is prone to collect.

During take off and climb of an aircraft, fuel rates are relatively high so the water can be removed more quickly from the fuel tank during these stages of the flight. Therefore preferably the water scavenging line is arranged to collect water from one or more water inlets, the fuel tank has a region at the bottom of the tank where water pools during take off or climb, and at least one of the water inlets is located adjacent to the region so as to collect water during take off or climb.

A third aspect of the invention provides a water scavenging system installed in an aircraft fuel tank and arranged to collect water from one or more water inlets and feed it into an engine of the aircraft, the fuel tank having a first region at the bottom of the tank where water pools during take off or climb, wherein at least one of the water inlets is located adjacent to the first region so as to collect water during take off or climb.

A fourth aspect of the invention provides a method of removing water from an aircraft fuel tank, the method comprising collecting water from a pool at the bottom of the fuel tank during take off or climb and feeding the water to an engine of the aircraft.

Preferably the fuel tank has a second region at the bottom of the tank where water pools when the aircraft is on the ground, and the system has no water inlets located adjacent to the second region.

Typically the first region is offset towards the rear of the fuel tank relative to the direction of travel of the aircraft.

BRIEF DESCRIPTION OF THE DRAWINGS

Embodiments of the invention will now be described with reference to the accompanying drawings, in which:

FIG. 5 is a detailed view of the fuel tank and water-scavenging pump of FIG. 4;
FIG. 6 shows an induction tube variant;
and FIG. 7 is a plan view showing part of a further alternative fuel system.

DETAILED DESCRIPTION OF EMBODIMENTS

Figure 1:
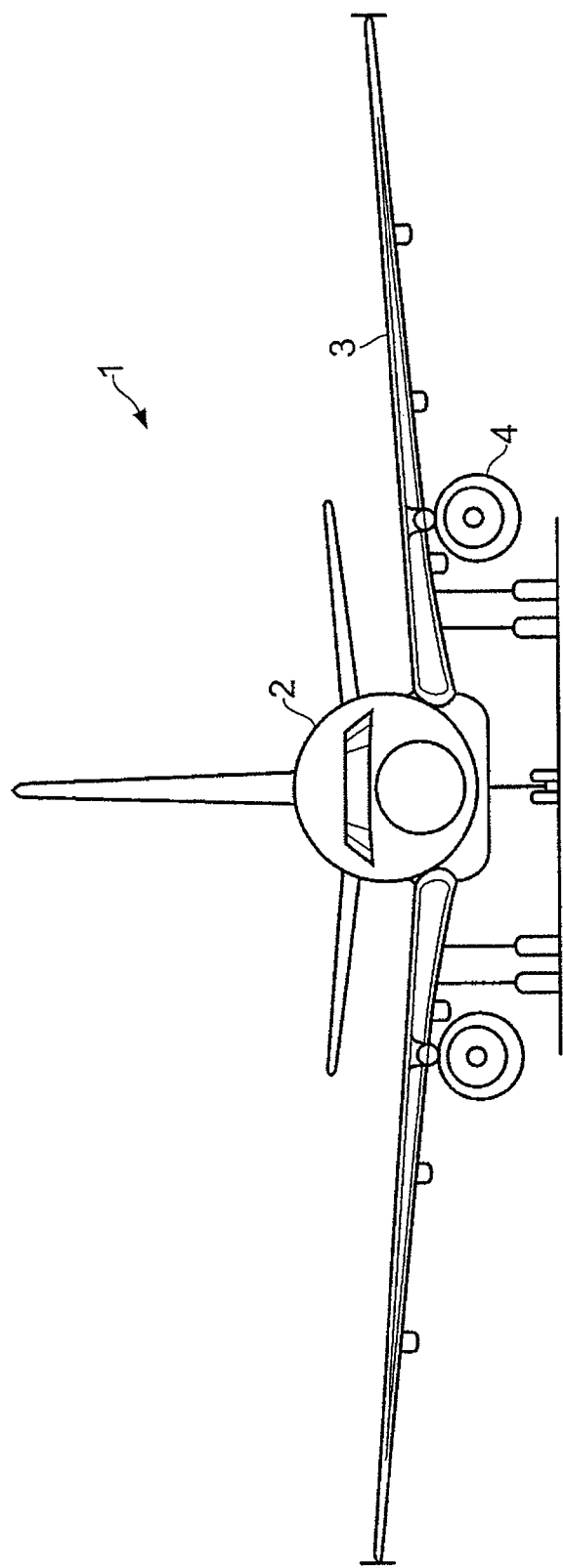
FIG. 1 shows an aircraft.

Referring to FIG. 1, an aircraft 1 comprises a fuselage 2 carrying a pair of wings, the left wing being labelled 3. Each wing carries an engine, the left hand engine being labelled 4 in FIG. 1. The engine includes a high pressure fuel pump (not shown) which requires a minimum inlet pressure, typically of the order of 5-10 psig.

Fuel for each engine is stored in a centre tank and one or more wing tanks. In the examples given below in FIGS. 2-7, only a single wing tank is described, but in practice there are additional wing tanks.

Figure 2:
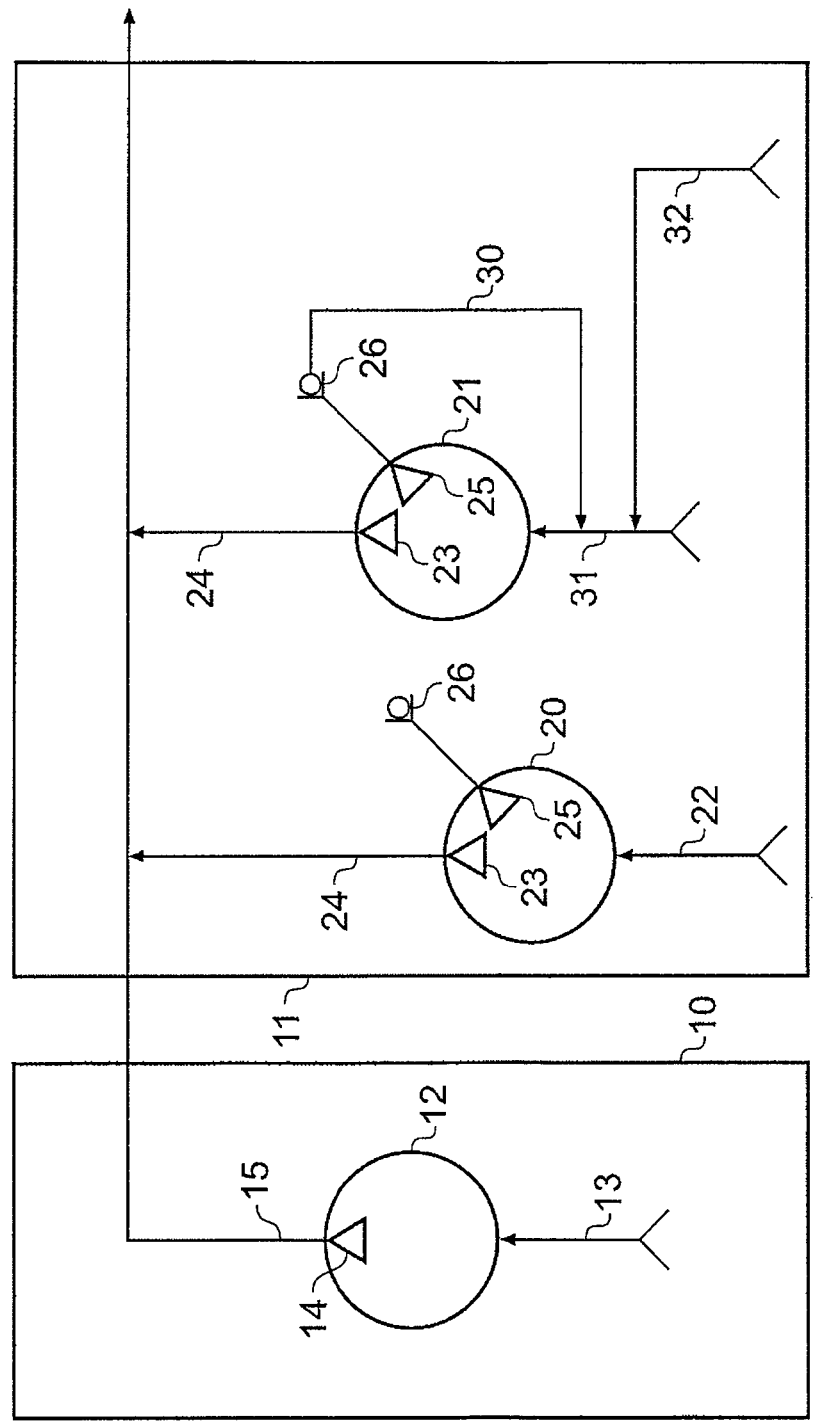
FIG. 2 shows part of the fuel system of the aircraft.

FIG. 2 is a schematic diagram showing the centre tank 10 and a wing tank 11 for the left hand wing 3.

The centre tank 10 has an electrically driven fuel pump 12 with an input line 13 for collecting fuel from the tank 10, and an outlet 14 that incorporates a non return valve to prevent flow back into the pump, coupled in series to a fuel line 15 which leads to the engine 4.

The wing tank 11 comprises a pair of electrically driven fuel pumps 20, 21 which are similar in construction (and are also similar to the fuel pump 12) so the same reference numerals will be used for equivalent parts. Each fuel pump 20, 21 comprises an input line 22,31 for collecting fuel from the tank, and a main outlet 23 which incorporates a non return valve to prevent flow back into the pump. The main outlet 23 is coupled in series to an output line 24. The output lines 24 are coupled in turn to the fuel line 15 in parallel with each other, and in parallel with the pump 12 in the centre tank 10. Each pump 20, 21 also has a re-circulating outlet 25 which is coupled to the inlet line 22,31 in parallel with the main outlet and non-return valve 23. The re-circulating outlet 25 leads to a pressure relief valve 26 that opens when the fuel pressure exceeds 24 psig. The valve 26 comprises a spring-loaded member which engages a valve seat and opens against the spring force when the pressure exceeds 24 psig. Thus the pressure point at which the valve opens can be adjusted by adjusting the degree of compression of the spring. The valve 26 attached to the second pump 20 opens into the fuel tank, but the valve 26 attached to the first (water scavenging) pump 21 leads to a recirculation line 30 which re-circulates the flow back into the input line 31.

The tanks are operated in sequence as follows.
1. The centre tank is only used if the flight is longer than approximately 2 hours. If it is not used the tank is empty and the pump 12 is not switched on as all fuel is supplied from the wing tanks.
2. When the engines are started before take off, the centre tank pump 12 and the wing tank pumps 20, 21 are operating. The fuel supply pressure from the centre tank pump 12 is approximately 40 psig which causes the relief valves 26 to automatically fully open to "de-rate" the wing tank pumps 20, 21. That is, with the centre tank pump operational the relief valves 26 open and flow from the centre tank takes precedence over flow from the wing tank as the wing pumps 20, 21 merely re-circulate the fuel. The non-return valves 23 prevent any of the higher pressure fuel from the centre tank from flowing into the wing tanks.
3. At take off the centre tank pump 12 is switched off, the relief valve 26 on the first pump 21 closes automatically in response to the drop in pressure, and all fuel is supplied from the wing tank. Two pumps 20,21 are provided in the wing tank for redundancy purposes. That is, if one of the pumps malfunctions, then the other pump alone is capable of pumping fuel at the rate required during take off and climb. A short time after take off the centre tank pump 12 is switched on and the relief valve 26 on the first pump open again to allow full recirculation in the wing tank so that the engines are supplied exclusively from the centre tank When the centre tank is empty the pressure in the fuel line 15 drops, causing the relief valve 26 to close again automatically. The fuel supply then continues from the wing tank, and the centre tank pump 12 is switched off again.

A problem with the re-circulating pump 20 is that any water fed into the pump will be atomised and redistributed into the wing tank 11 creating "snow" or causing icing in the tank at lower temperatures seen at altitude. Once the aircraft is at cruise altitude the external temperature is very low and the tank temperature will cool to less than the freezing point of water in approximately 30 minutes. After the water has frozen it is not possible to remove it from the tank until the aircraft thaws.

A water scavenging line 32 shown in FIG. 2 collects water from the sump of the wing tank 11 and injects it into the input line 31 of the pump 21. A recirculation duct 30 prevents this water being re-circulated into the wing tank 11, and potentially causing the "snow" or icing problems described above.

Figure 3:
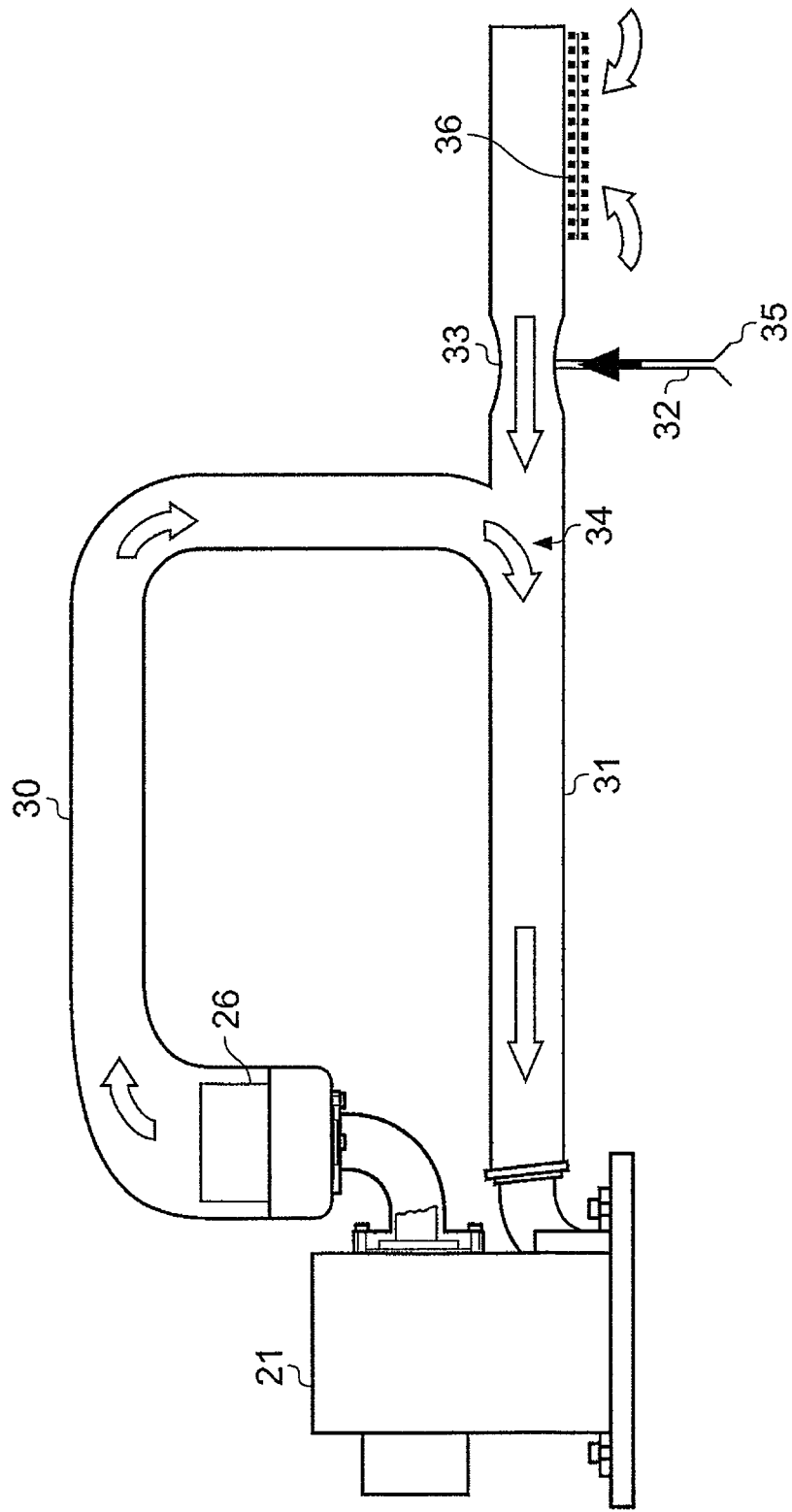
FIG. 3 is a detailed view of the water-scavenging pump.

The water scavenging system is shown in further detail in FIG. 3. The input line 31 has a fuel inlet 36 (incorporating a strainer) in the body of the fuel tank, and a jet pump comprising a venturi 33 which extends around the circumference of the pump input line. The venturi 33 is positioned upstream of the Y-connector junction 34 where the recirculation line 30 meets the inlet line 31. The water scavenging line 32 has an water inlet 35 at the sump of the fuel tank, and an outlet hole in the throat of the venturi 33. The low pressure at the throat of the venturi 33 sucks water from the water inlet 35 into the pump input line 31 and injects it into the main flow. By injecting the water into the pump input line 31 at a junction (that is, the outlet in the throat of the venturi 33) downstream of the fuel inlet 36, the system ensures that the water is delivered directly to the pump 21.

The use of the venturi effect ensures that water is delivered at a rate proportional to the fuel flow through the pump input line. The venturi 33 is designed to only suck a significant amount of water at the high flows during take off and climb. As a result the water concentration is automatically limited to a level acceptable to the engine.

The re-circulation line 30 prevents any water that is sucked up from being distributed back into the tank 11. Because the junction 34 is downstream of the venturi 33, the recirculation line 30 also limits the flow through the venturi 33 to the pump flow that leaves the wing tank. During take off and climb this is predominantly engine flow.

The water scavenging system shown in FIGS. 3 is entirely automatic and powered by the hydraulic action of fuel in the inlet line 31. As a result no electrical power or data lines need to be routed into the fuel tank for the water scavenging system.

Disadvantages of the system of FIG. 3 are:
the performance of the first pump 21 may be reduced compared with that of the second pump 20
the performance of the sequence valve 26 on the pump 21 may be reduced compared with that of the sequence valve 26 on the pump 20
the recirculation line 30 may be of a size and complexity which makes it difficult to fit.

Figure 4:
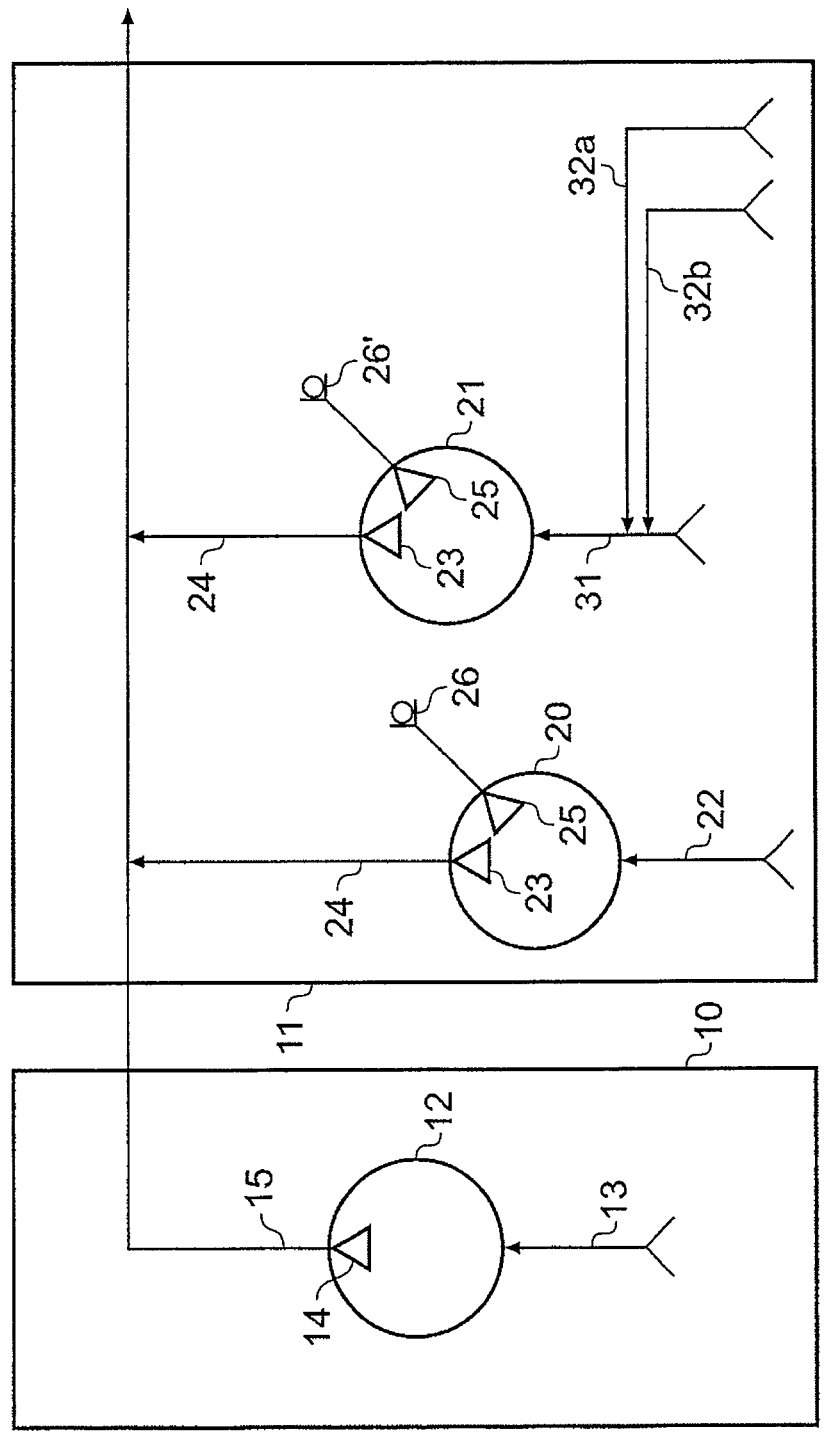
FIG. 4 shows part of an alternative fuel system with no re-circulation line on the water scavenging pump.

The fuel system shown in FIGS. 4-6 address these problems. The fuel system shown in FIGS. 4-6 is similar to that shown in FIG. 2, and similar features are given the same reference numerals. In the system of FIGS. 4-6, the recirculation line 30 is omitted, and the sequence valve 26' on the first pump 21 re-circulates the fuel into the tank (similar to the sequence valve 26 on the second pump 20). The water scavenging system employs a pair of scavenging lines 32a,32b which are positioned side-by-side at the throat of the jet pump venturi 33 as shown in FIG. 5.

Water tends to pool in the lowest region at the bottom 43 of the wing tank, and this region changes depending on the orientation of the aircraft. The lowest region when the aircraft is on the ground is indicated at 42 in FIG. 6. In the example of FIG. 6 the bottom of the wing tank is curved so the region 42 is towards the centre of the wing tank. At take off the aircraft pitches upwards at a steep angle so the pool of water moves to a different region indicated at 41 in FIG. 6, which is offset towards the rear of the water tank relative to the direction of travel of the aircraft. During climb the angle is less steep, and the pool moves to region 40, also offset towards the rear of the wing tank relative to the direction of travel of the aircraft, but by a lesser extent than the region 41. The inlet 35a of the scavenging line 32a is positioned adjacent to the region 40, and the inlet 35b of the scavenging line 32b is positioned adjacent to the region 41. This ensures that water is only picked up during take off and climb, when the sequence valve 26' is closed. When the aircraft is on the ground, the sequence valve 26' is open (because the centre tank pump is delivering higher pressure fuel) but no water will be picked up and re-circulated into the tank. This is because there is no scavenging inlet adjacent to the region 42 where water tends to collect when the aircraft is on the ground.

The pressure setting of the sequence valve 26' attached to the water scavenging pump 21 is set above that of the sequence valve 26 on the pump 20. This ensures that only the pump 21 will deliver fuel during take off and climb, unless that pump fails, in which case the pump 20 will take over. The sequence valves 26 in the system of FIG. 2 also have such a differential pressure setting.

By delivering fuel during take off and climb from only the water scavenging pump 21, the amount of water delivered to the engine is maximised. This is because the majority (between 70% and 95%) of the flow picked up by the pump 21 will be delivered to the engine, and only a small amount (between 5% and 30%) will be re-circulated into the tank. In contrast if both sequence valves 26,26' were open during take off and climb, then a smaller amount (between 35% and 46%) of the flow picked up by the pump 21 would be delivered to the engine, and the remainder (between 54% and 65%) would be re-circulated into the tank.

A variant of the jet pump interface between the water scavenging lines and the pump input line is shown in FIG. 6. In this case the walls of the pump input line 31 are parallel (that is, there is no venturi) and the scavenging lines 32a,32b feed into an induction tube 50 which passes through the wall of the pump input line 31 and bends by 90° in the direction of flow. The induction tube 50 creates a constriction in the line 31 which results in a reduced pressure at the outlet of the tube 50. This reduced pressure draws the water from the induction tube 50 into the centre of the line 31 by the venturi effect.

The centre tank 10 may have a water-scavenging system (not shown) of the kind described in U.S. Pat. No. 4,809,934 or of the kind described above with reference to FIGS. 4-6 (but without the re-circulation outlet).

The fuel system shown in FIG. 7 is similar to that shown in FIGS. 2 and 4, and similar features are given the same reference numerals. Note that FIG. 7 is a plan view with the X-direction (that is, the direction of travel) of the aircraft pointing vertically down, in contrast to FIG. 6 which is a side view with the X-direction (not shown) pointing horizontally to the left.

In the case of FIG. 7 a fuel scavenging system for the centre tank 10 is shown. The fuel scavenging system comprises a set of three scavenging inlets connected to a jet pump 61. The motive flow for the jet pump 61 is provided by a line 60 which branches out from the fuel line 15 and feeds the fuel back into the input line 13.

The output lines 24 from the pumps 20,21 are coupled with each other in parallel at a junction 68 upstream of the junction 69 with the main fuel line.

The lowest region when the aircraft is on the ground is indicated at 64 in FIG. 7. At take off and climb the aircraft pitches upwards at a steep angle so the pool of water moves back to a different region 65 which is offset towards the rear of the water tank 11 relative to the direction of travel X of the aircraft. This ensures that water is only picked up during take off and climb, when the sequence valve 26' is closed. When the aircraft is on the ground, the sequence valve 26' is open but no water will be picked up and re-circulated into the tank. This is because there is no scavenging inlet adjacent to the region 64 where water tends to collect when the aircraft is on the ground.

In contrast with the arrangements of FIGS. 2 and 4, in which the jet pump is formed in the pump input line 31, a separate jet pump 70 is used with its motive flow being provided by a re-circulating line 66 which re-circulates fuel back into the input line 31. This means that no construction is required in the fuel input line 31.

The outlet of the re-circulating line 66 is in the fuel tank upstream of the fuel inlet 72, but is sufficiently adjacent to the fuel inlet 72 (and directed towards the fuel inlet 72) so that the majority of the flow from the re-circulating line 66 is picked up by the fuel inlet 72. Alternatively, the output of the re-circulating line 66 may be in the input line 31 downstream of the fuel inlet 72.

A line 73 feeds fuel from both of the pumps 20,21 to an outer wing tank in order to provide motive flow for further fuel scavenging lines (not shown).

A gravity feed line 74 feeds fuel towards the engine by the action of gravity in the event that both pumps 20 and 21 fail.

In the embodiments described above, the pumps 20, 21 are identical and have the same outlet pressure. The first pump 21 is configured to pump fuel towards the engine at a higher rate than the second pump 20 by setting its sequence valve with a higher pressure. In a further embodiment of the invention, the sequence valves 26,26' may be omitted completely, and the first pump 21 in this case is a larger pump with a higher outlet pressure than the second pump 20. This difference in outlet pressure has a similar effect to the differentially set sequence valves: that is, it ensures that little or no fuel will be fed towards the engine by the second pump 20, unless the first pump 21 fails.

Although the invention has been described above with reference to one or more preferred embodiments, it will be appreciated that various changes or modifications may be made without departing from the scope of the invention as defined in the appended claims.

The invention claimed is:

1. A fuel pumping and water scavenging system comprising: first and second fuel pumps each arranged to collect fuel from the same fuel tank and pump it towards an engine; and a water scavenging line coupling a water inlet in the fuel tank to the first pump, wherein the first pump is arranged to pump fuel towards the engine at a higher rate than the second pump when the first pump and the second pump are both operational, unless the first pump fails, the system further comprising a pump input line coupling a fuel inlet to the first pump, wherein the water scavenging line couples the water inlet to the pump input line via a junction downstream of the fuel inlet, and wherein the water is delivered directly to the pump by the pump input line.

2. The system of claim 1 wherein the pump input line has a constriction, and the junction is located adjacent to the constriction whereby the hydraulic action of fuel in the pump input line draws water from the water scavenging into the pump input line by the venturi effect.

3. The system of claim 2 wherein the junction comprises an opening in the constriction in the pump input line.

4. The system of claim 2 wherein the constriction in the pump input line extends around the circumference of the pump input line.

5. The system of claim 1 wherein the water scavenging line passes through a wall of the pump input line.

6. The system of claim 1 wherein the first fuel pump further comprises a re-circulating outlet, and the system further comprises a re-circulating line coupling the re-circulating outlet to the pump inlet via the water scavenging line outlet.

7. The system of claim 1 wherein the engine is an aircraft engine.

8. The system of claim 7 wherein the water scavenging line is arranged to collect water from one or more water inlets, the fuel tank has a region at the bottom of the tank where water pools during take off or climb, and at least one of the water inlets is located adjacent to the region so as to collect water during take off or climb.

9. A fuel pumping and water scavenging system, comprising: first and second fuel pumps each arranged to collect fuel from the same fuel tank and pump it towards an engine; and a water scavenging line coupling a water inlet in the fuel tank to the first pump, wherein the first pump is arranged to pump fuel towards the engine at a higher rate than the second pump when the first pump and the second pump are both operational, unless the first pump fails, the system further comprising a pump input line coupling a fuel inlet in the fuel tank to the first pump, wherein the water scavenging line has an outlet in the fuel tank configured to deliver scavenged water into the fuel tank, the outlet being adjacent to the fuel inlet and directed towards the fuel inlet such that scavenged water delivered into the fuel tank by the water scavenging line outlet can be taken up by the fuel inlet, and wherein the scavenged water is delivered directly to the pump by the pump input line.

10. A fuel pumping and water scavenging system comprising: first and second fuel pumps each arranged to collect fuel from the same fuel tank and pump it towards an engine; and a water scavenging line coupling a water inlet in the fuel tank to the first pump, wherein the first pump is arranged to pump fuel towards the engine at a higher rate than the second pump when the first pump and the second pump are both operational, unless the first pump fails, wherein the first fuel pump further comprises a main outlet arranged to pump fuel towards the engine and a re-circulating outlet with a first valve which closes at a first pressure; and wherein the second fuel pump further comprises a main outlet arranged to pump fuel towards the engine and a re-circulating outlet with a second valve which closes at a second pressure which is lower than the first pressure.

11. A fuel pumping and water scavenging system comprising: first and second fuel pumps each arranged to collect fuel from the same fuel tank and pump it towards an engine; and a water scavenging line coupling a water inlet in the fuel tank to the first pump, wherein the first pump is arranged to pump fuel towards the engine at a higher rate than the second pump when the first pump and the second pump are both operational, unless the first pump fails, wherein the pumps have respective output lines which are coupled in parallel with each other, and the first fuel pump has a first outlet pressure when it is pumping fuel and the second fuel pump has a second outlet pressure when it is pumping fuel, and wherein the first outlet pressure is higher than the second outlet pressure.

12. A method of removing water from a fuel tank using the system of claim 1, the method comprising feeding water into the first pump with the water scavenging line; pumping fuel towards the engine with the first pump at a higher rate than the second pump; and pumping fuel towards the engine with the second pump at a higher rate than the first pump on failure of the first pump.

* * * * *